(12) United States Patent
Moses et al.

(10) Patent No.: US 11,548,600 B2
(45) Date of Patent: Jan. 10, 2023

(54) UNMANNED AERIAL VEHICLE SEARCH AND RESCUE SYSTEM

(71) Applicants: Thomas Lawrence Moses, Greenville, SC (US); Merrill Stuart Ross, New Lebanon, NY (US)

(72) Inventors: Thomas Lawrence Moses, Greenville, SC (US); Merrill Stuart Ross, New Lebanon, NY (US)

(*) Notice: Subject to any disclaimer, the term of this patent is extended or adjusted under 35 U.S.C. 154(b) by 0 days.

(21) Appl. No.: 17/391,293

(22) Filed: Aug. 2, 2021

(65) Prior Publication Data
US 2021/0354795 A1 Nov. 18, 2021

Related U.S. Application Data

(60) Division of application No. 16/380,446, filed on Apr. 10, 2019, now Pat. No. 11,136,096, which is a
(Continued)

(51) Int. Cl.
B63C 9/01 (2006.01)
B64C 39/02 (2006.01)
(Continued)

(52) U.S. Cl.
CPC .............. B63C 9/01 (2013.01); B64C 25/54 (2013.01); B64C 27/52 (2013.01); B64C 39/024 (2013.01); B64D 47/06 (2013.01); B64D 47/08 (2013.01); G01S 19/45 (2013.01); G08B 21/088 (2013.01); B63B 2035/005 (2013.01);
(Continued)

(58) Field of Classification Search
CPC ..... B63B 2035/005; B63C 9/01; B64C 25/54; B64C 27/52; B64C 2201/027; B64C 2201/12; B64C 39/024; B64D 47/06; B64D 47/08
See application file for complete search history.

(56) References Cited

U.S. PATENT DOCUMENTS

2015/0066248 A1 3/2015 Arbeit et al.
2016/0167470 A1* 6/2016 Seydoux .................. B63H 7/02
244/2
(Continued)

FOREIGN PATENT DOCUMENTS

CN 107458608 A * 12/2017

Primary Examiner — Richard G Davis
(74) Attorney, Agent, or Firm — Southeast IP Group; Thomas L. Moses

(57) ABSTRACT

A search and rescue drone system includes a buoyant body member, a frame attached to the buoyant body member for carrying a motor and propeller, and an electronic array including a camera, GPS, an EPIRB radio distress beacon, and a transmitter/receiver for remote control flying the drone and communicating with an operator. A laser guidance system may provide coordinates for landing near a swimmer in distress. The search and rescue drone may also be programmed to simply fly to the location of an electronic wearable device, like a bracelet, that is worn by a man overboard. In another embodiment, the search and rescue drone includes pivoting motor mounts, so that it can take off and land vertically with propellers rotating in a horizontal plane, and then the propellers may pivot to rotate in a vertical plane for propulsion across water similar to a fan boat with rescued people aboard.

6 Claims, 10 Drawing Sheets

Related U.S. Application Data continuation-in-part of application No. 16/045,137, filed on Jul. 25, 2018, now Pat. No. 10,668,997.

(51) Int. Cl.

| | | |
|---|---|---|
| *B64C 25/54* | (2006.01) | |
| *B64C 27/52* | (2006.01) | |
| *B64D 47/06* | (2006.01) | |
| *G01S 19/45* | (2010.01) | |
| *G08B 21/08* | (2006.01) | |
| *B64D 47/08* | (2006.01) | |
| *B63B 35/00* | (2020.01) | |

(52) U.S. Cl.
CPC .... *B64C 2201/027* (2013.01); *B64C 2201/12* (2013.01); *B64C 2201/146* (2013.01)

(56) References Cited

U.S. PATENT DOCUMENTS

| | | |
|---|---|---|
| 2016/0340006 A1 | 11/2016 | Tang |
| 2017/0029106 A1* | 2/2017 | Chang ..................... B64C 37/00 |
| 2017/0088261 A1 | 3/2017 | Sequeira et al. |
| 2017/0210451 A1 | 7/2017 | Oh |

* cited by examiner

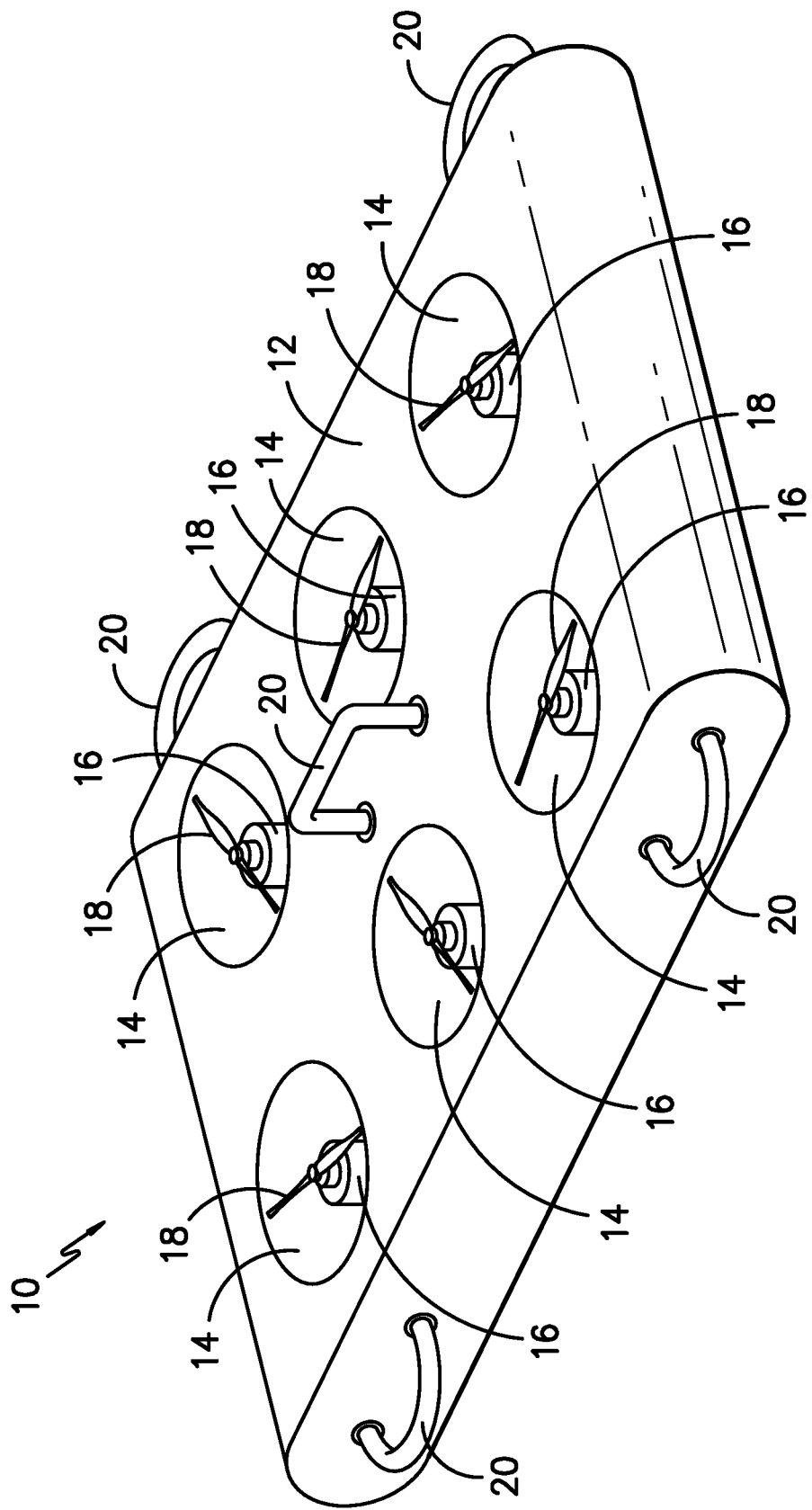
FIG. -1-

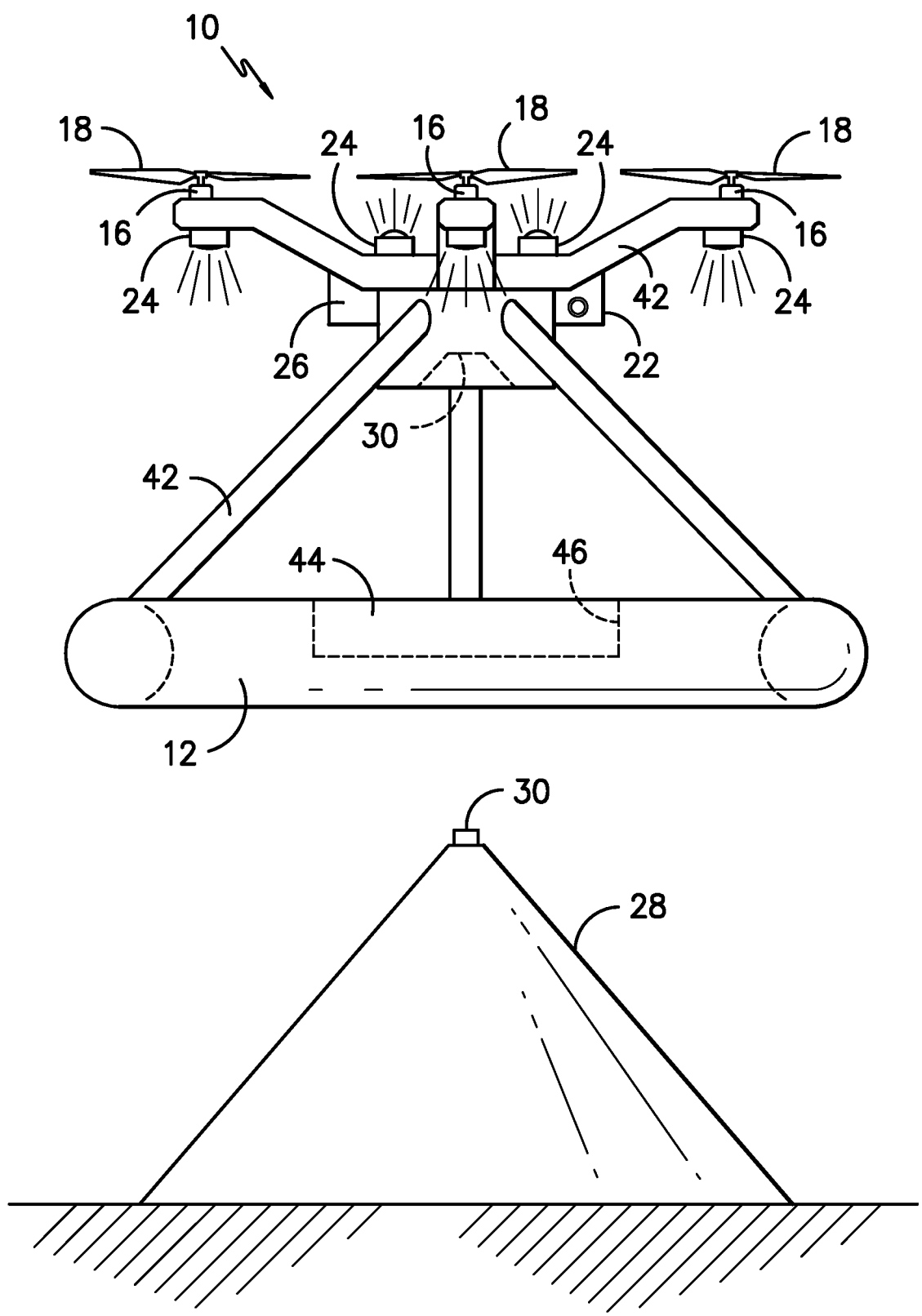
FIG. -2A-

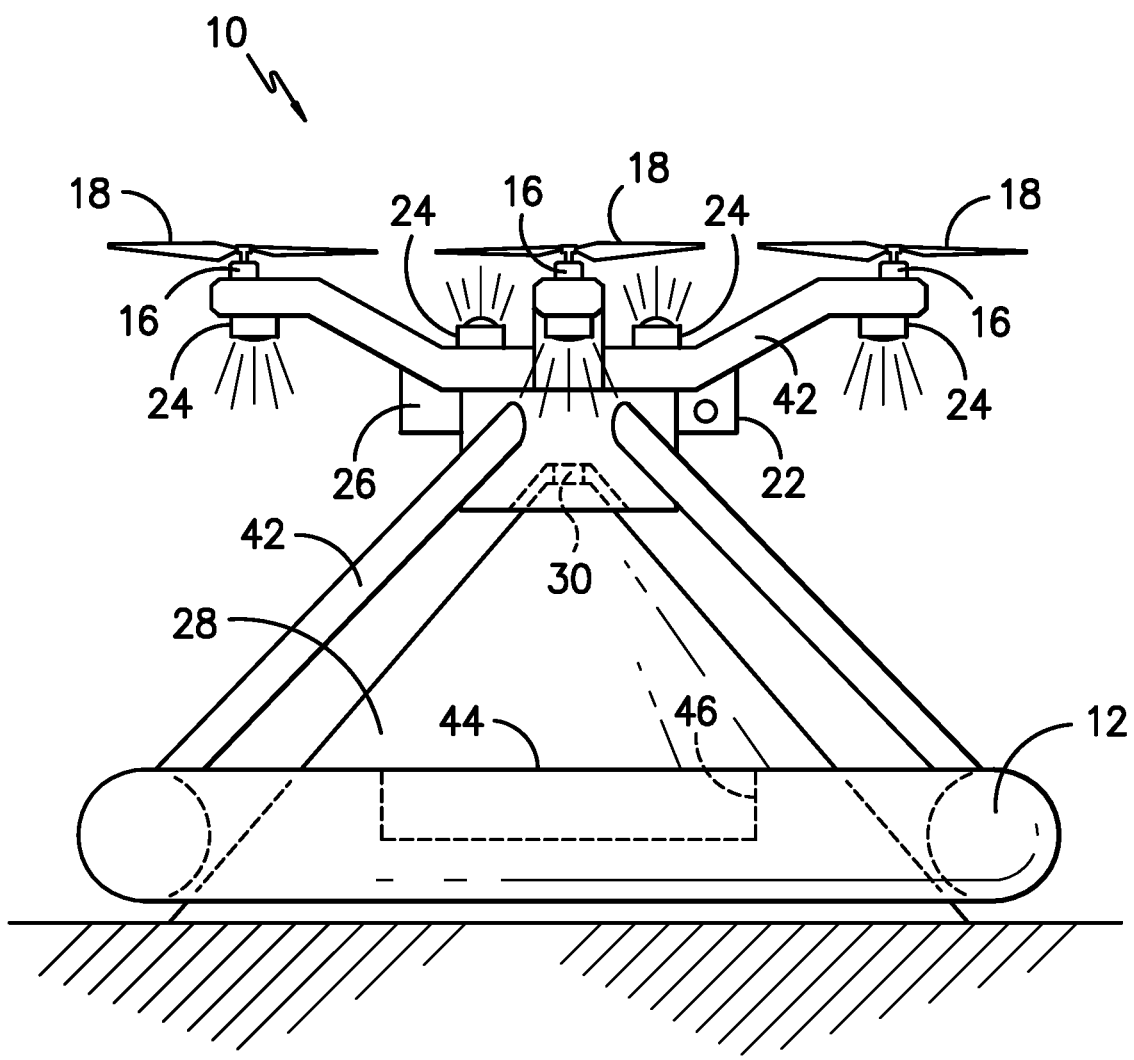
FIG. -2B-

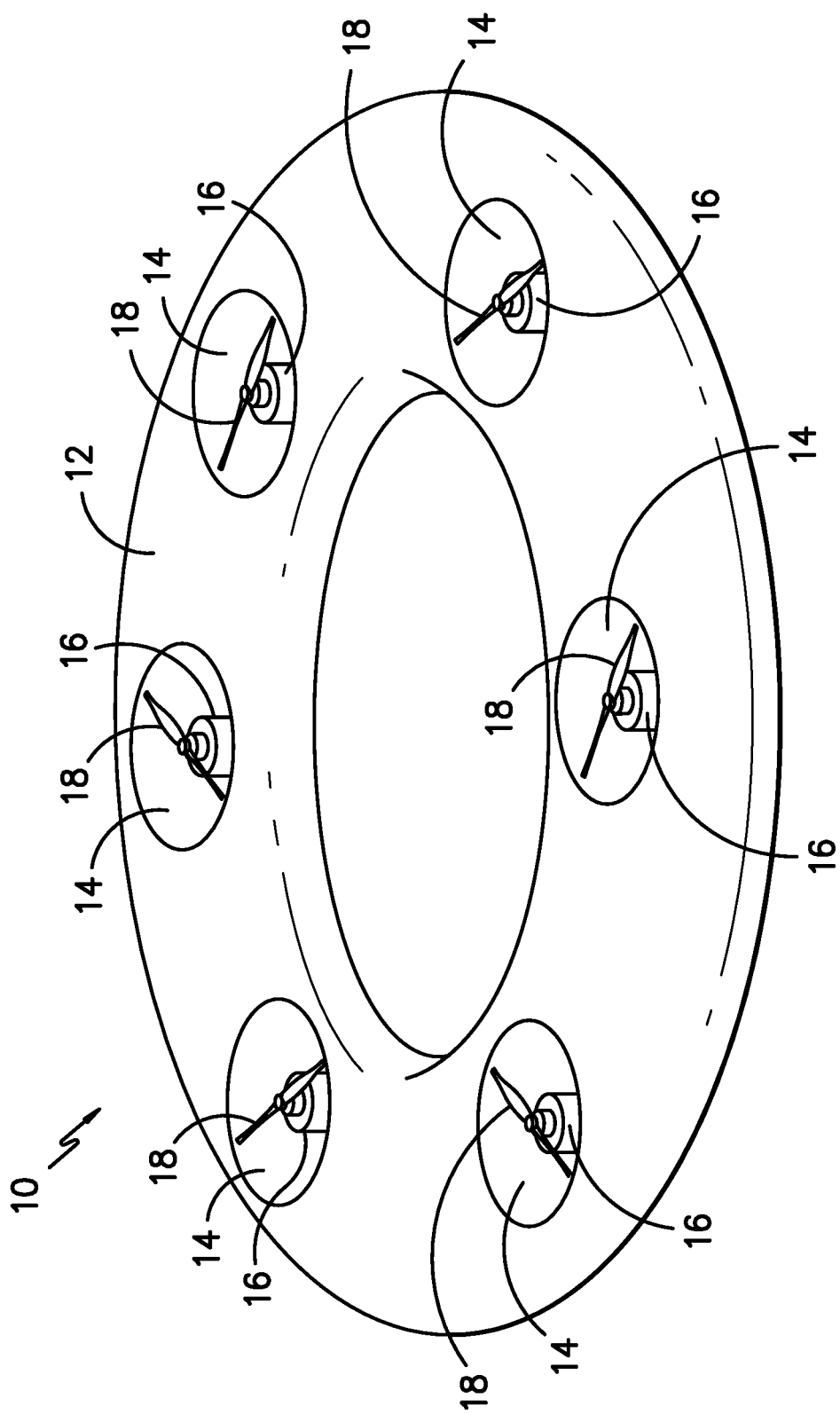
FIG. -3-

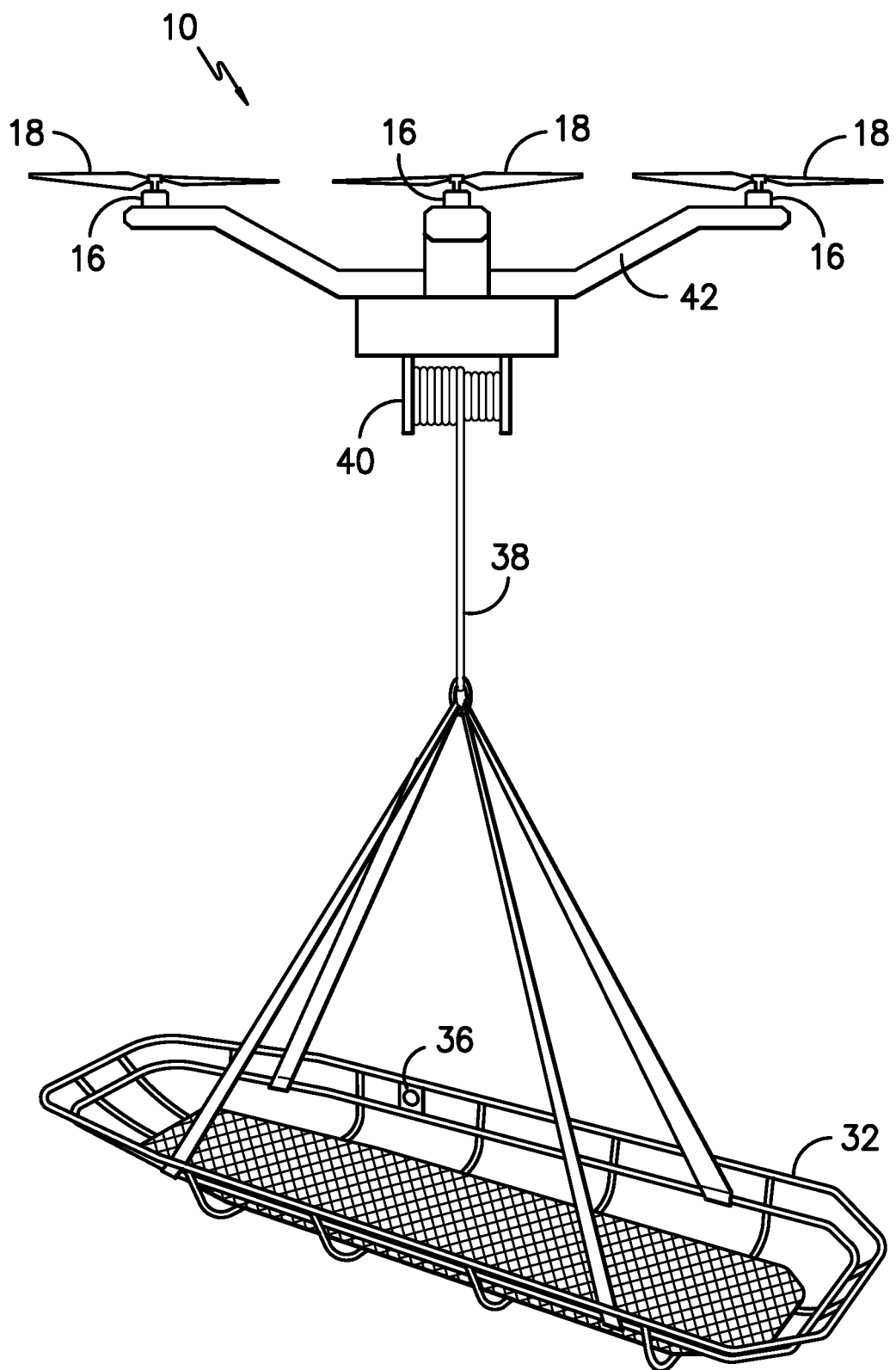
FIG. -4-

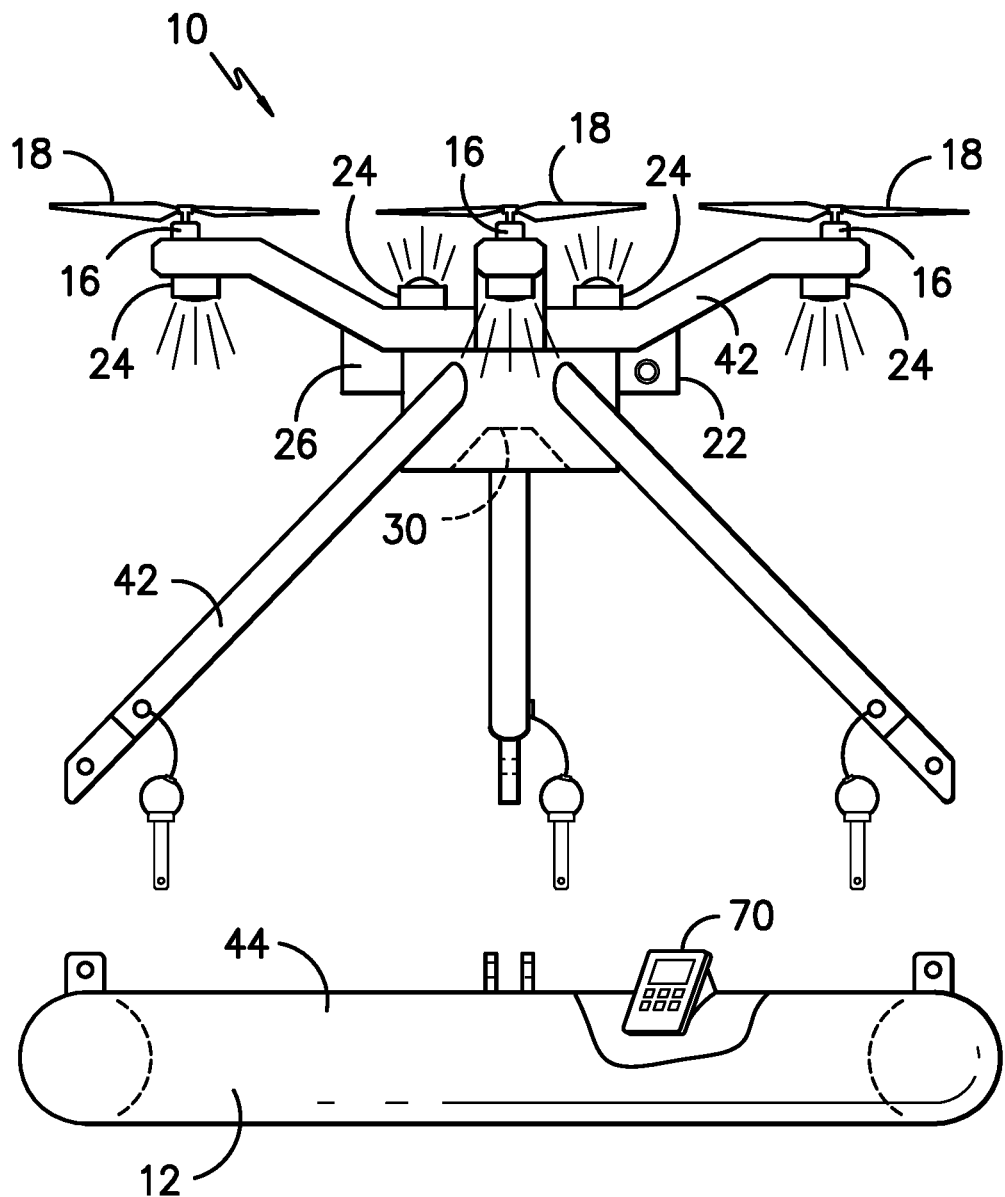
FIG. -5-

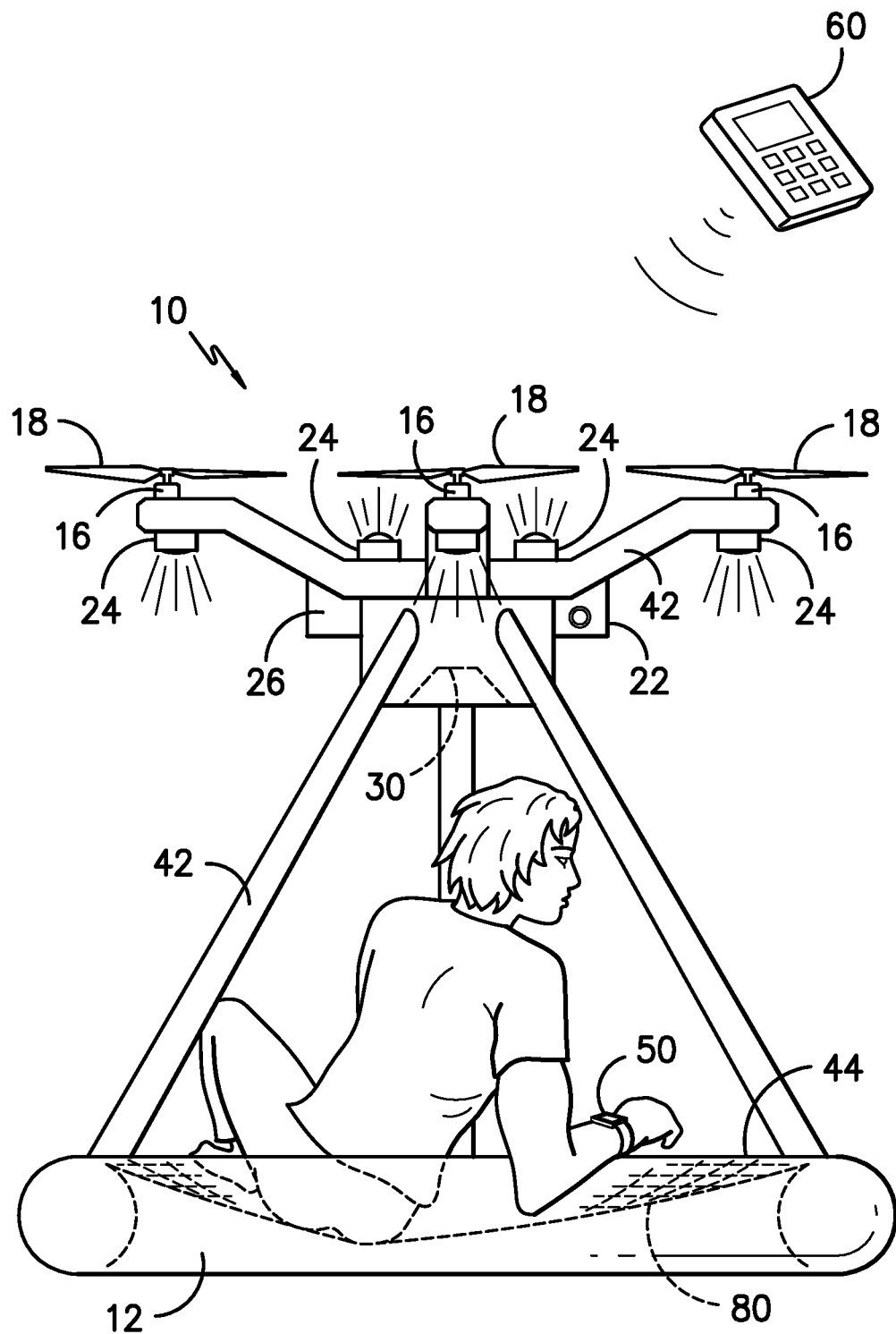
FIG. -6-

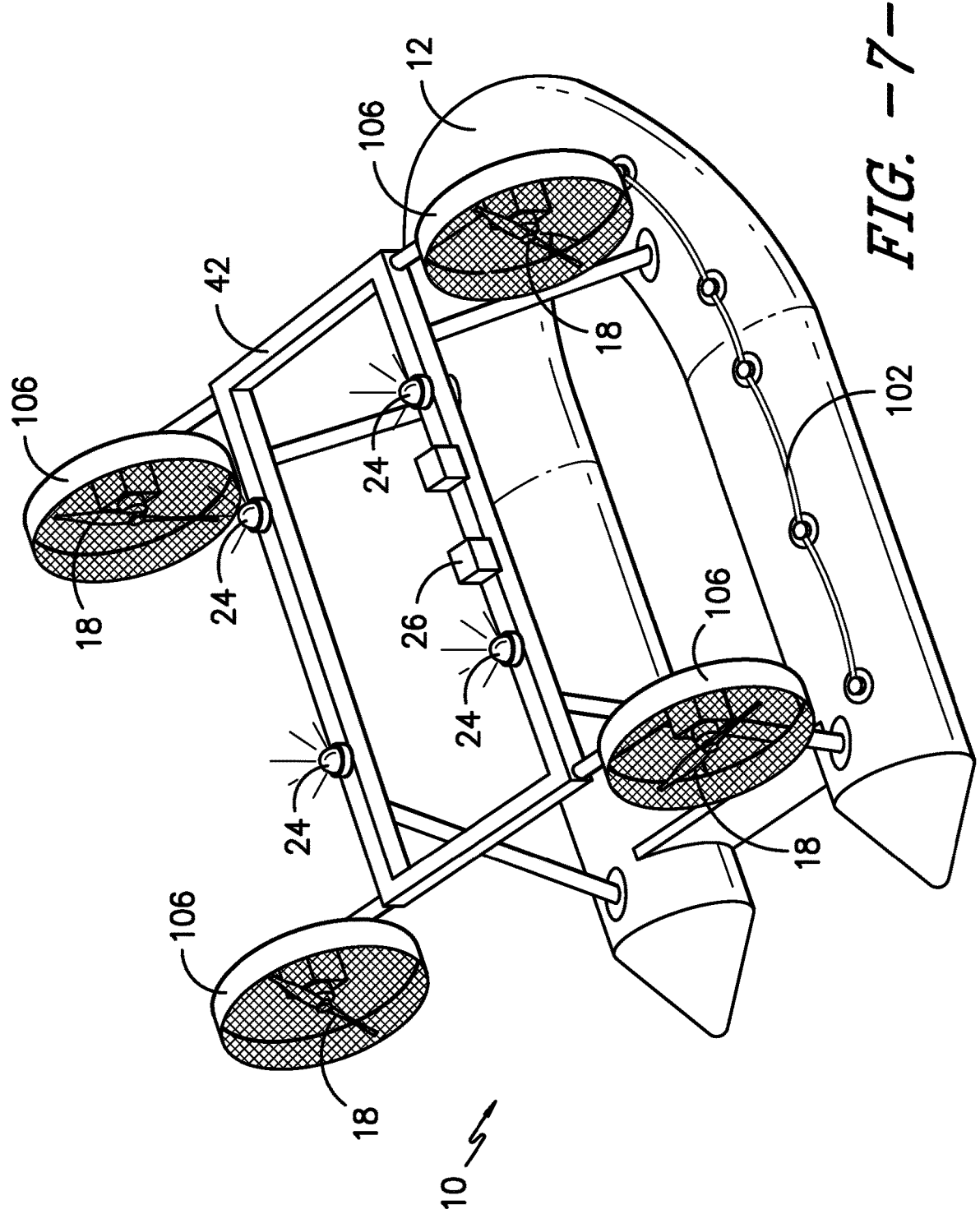

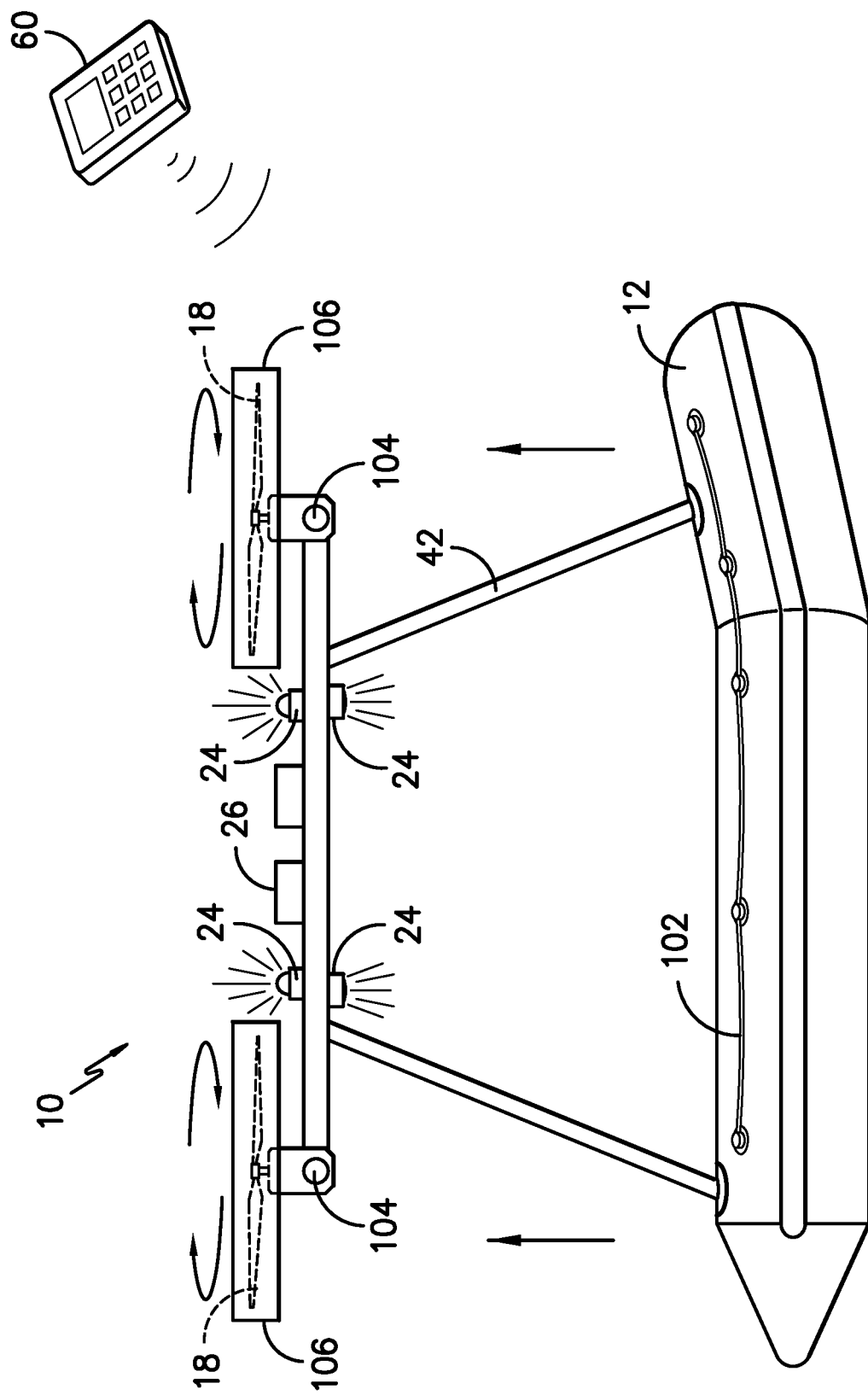

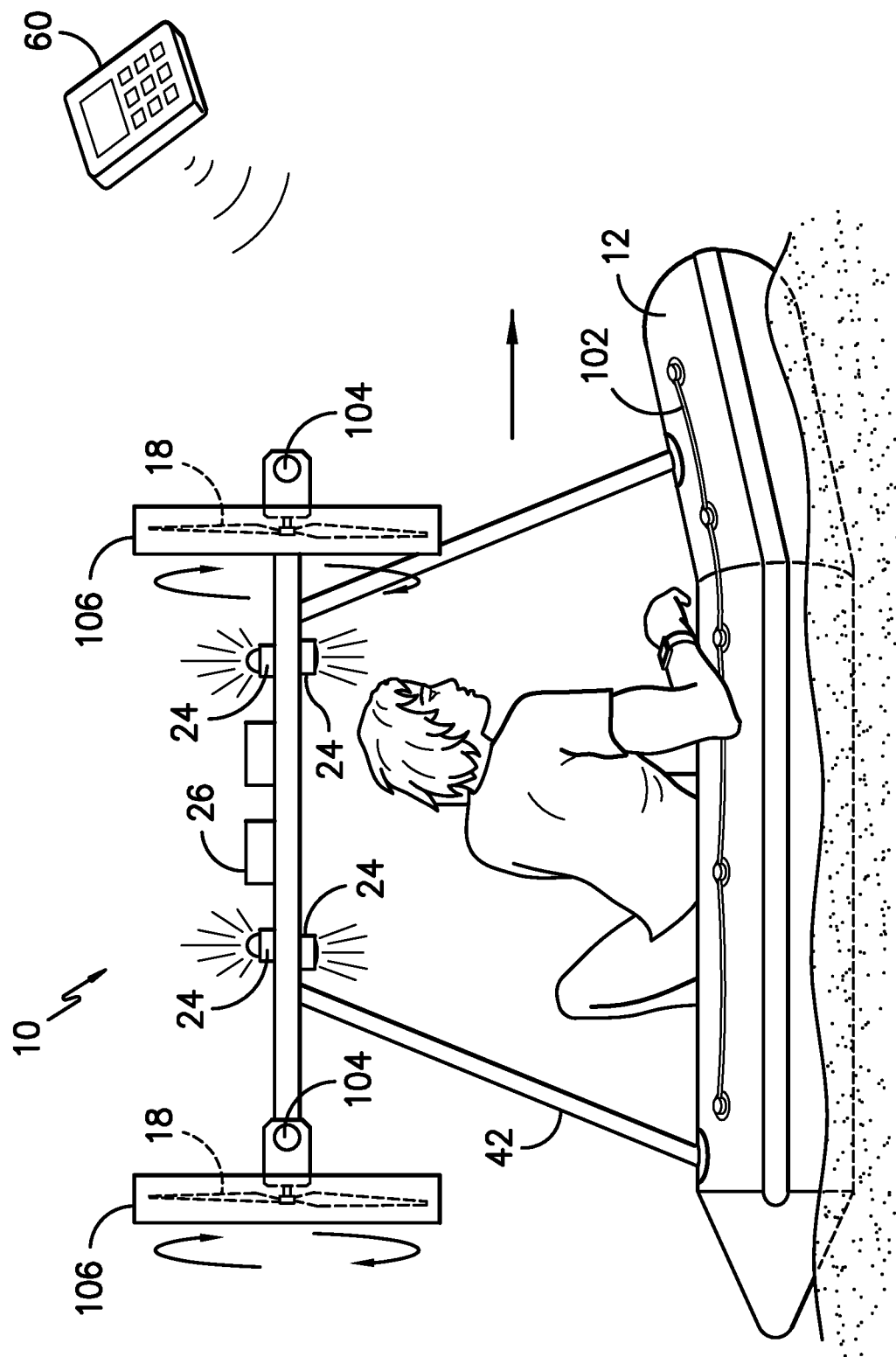
FIG. -9-

UNMANNED AERIAL VEHICLE SEARCH AND RESCUE SYSTEM

CROSS REFERENCE TO RELATED APPLICATIONS

The present application is a divisional of U.S. application Ser. No. 16/380,446 entitled Unmanned Aerial Vehicle Search and Rescue System, filed on Apr. 10, 2019, which is a continuation-in-part of U.S. application Ser. No. 16/045,137 entitled Unmanned Aerial Vehicle Search and Rescue System, filed on Jul. 25, 2018. All of the foregoing applications are hereby incorporated by reference in their entireties.

BACKGROUND OF THE INVENTION

Unmanned aerial vehicles (hereinafter "UAVs" or "drones") are becoming ubiquitous, and are increasingly being deployed for many different uses and tasks. Recently, UAVs have been used by lifeguards at beaches to monitor swimmers, and in one case, a UAV was equipped with a mechanism for dropping a life preserver to save a swimmer in distress. Along those lines, UAVs may be particularly helpful in man-overboard situations, along with other swimmer-in-distress events. There are many reported cases of people disappearing from cruise ships, and in such an event, a UAV is highly useful for conducting search and rescue operations because it can be quickly and easily deployed directly from the ship, provides a bird's eye view over a large area, and can quickly cover large distances in a short period of time. A search and rescue drone could be used on commercial fishing vessels and other types of boats and ships, particularly including those that routinely operate in bad weather conditions. In a man overboard situation, time is critical, especially in colder waters, where life expectancy may be around 15 minutes before hypothermia and even death occurs. Thus, the ability to deploy a search and rescue drone to quickly locate and provide assistance to a swimmer in distress could mean the difference between life and death.

Efforts are underway to develop UAVs specifically for search and rescue operations, particularly involving water rescue operations. The following references show several examples of such development efforts for UAVs, and these references are incorporated herein by reference, in their entireties:

US Application Publication No, US20150066248—Unmanned Vehicle Searches

A method of planning a flight path for a search can include receiving, by a control system, an indication of a search area boundary; receiving, by the control system, an indication of a selected search pattern; determining, by the control system, a flight path based on the search area boundary and the selected search pattern; and transmitting one or more indications of the flight path to an unmanned aerial vehicle.

US Application Publication No, US20160340006—Unmanned Aerial Vehicle System and Methods for Use A drone equipped with a camera, a wireless communication module, an acoustic sensor, a GPS receiver, software and collapsible floatation device patrols above swimmers. The camera and acoustic sensor capture the video and audio of the swimmers. The information is either streamed to a command center or processed by the onboard software. With audio and video analysis capabilities, software is used to detect a swimmer in distress (SID). Alternatively the information is streamed to lifeguard or volunteers all over the world to spot SID.

Another detection method is to let a swimmer wear a wearable emergency notification device, which sends wireless signals comprising GPS location data. A SID presses a button to indicate rescue request and the drones fly over by GPS signal guidance. Solar power is used as the optional power source of the drones, which would alto the to sustain operation for a prolonged period of time. Once a SID is identified, the drone or drones fly over the SID and drops the collapsible floatation device.

US Application Publication No. US20170088261—Search and Rescue UAV System and Method An no warmed aerial vehicle (UAV) having at least one sensor for detecting the presence of a survivor in a search and rescue area. The at least one sensor is preferably an ultra-wide band (UWB) transceiver sensor. The UAV includes a UAV data link transceiver for wirelessly communicating information concerning the survivor to a command center.

US Application Publication No. US20170210451—Drone-Type Lifesaving Equipment Propping Device A drone-type lifesaving equipment dropping device including: an unmanned aerial vehicle (2) having a propeller (4) and a rotor (3) configured to rotate the propeller; a holding member (10) which is installed to the unmanned aerial vehicle (2) and configured to be operated by wireless control; and a lifesaving equipment which is detachably engaged to the holding member (10) and is dropped from the holding member (10) after the lifesaving equipment is disengaged from the holding member.

Although each of the above-referenced systems is useful for search and rescue operations, and several of these systems may be used to deliver a flotation device or life preserver, none of the prior references discloses a UAV that is buoyant so that the UAV is, itself, a flotation device to assist a swimmer in distress (SID). Therefore, it would be desirable to provide a UAV that serves as a mobile life preserver, which is capable of landing on water and taking off from water, and which includes electronics for determining its position and transmitting an SOS signal, similarly to an emergency position-indicating radio beacon (EPIRB). Further, it would be advantageous, in man overboard types of situations, to provide the search and rescue drone with flashing lights, a spotlight, a camera and other sensors for locating a swimmer in distress, along with the capability for the UAV to autonomously fly along the same path (in reverse) that the boat was traveling when the man overboard situation occurred. Additionally, it would be advantageous to provide an electronic wearable device having the capability to communicate with the search and rescue drone, so that the drone may autonomously track the wearable device and fly to its location in an emergency situation.

BRIEF SUMMARY OF THE INVENTION

In accordance with one aspect of the invention, one embodiment of a search and rescue drone includes a buoyant body member, a frame attached to the buoyant body member for carrying a motor and propeller, and an electronic array including a camera, GPS, an EPIRB, and a transmitter/receiver for manually flying the drone and communicating with an operator.

The search and rescue drone may be flown manually, or may have some autonomous flight and locator capabilities. For example, in one embodiment, the search and rescue drone Wray be programmed to simply fly to the location of an electronic wearable device, like a bracelet, that is worn by a person on a boat. The wearable device may be automatically activated upon immersion in water, or may be manually activated (by pressing a button on the device, or by giving voice commands, for instance), but in either circumstance, the activation of the wearable device triggers the search and rescue drone to automatically fly to the location of the wearable device and land nearby, so that the SID may hold onto it for purposes of flotation. Preferably, the search and rescue drone is equipped with flashing strobe lights or other emergency lights that are used as a visual signal for help to get the attention of a search and rescue party. Also, the EPIRB on board transmits a distress signal, along with GPS coordinates of its present location, when the search and rescue drone lands in the water.

In another embodiment, the search and rescue drone includes a basket, harness, or other means for actually recovering a swimmer in distress, and flying that person back to a ship or to shore. In this embodiment, the drone may either land in the water so that a swimmer in distress may climb aboard, or the drone may lower a basket or harness down to the swimmer while the drone hovers overhead. In either embodiment, the drone may be equipped with a button or other means for indicating that the swimmer is safely aboard the basket or is engaged within the harness, which then triggers the drone to fly the swimmer back to safety.

When used on board a boat or ship, the search and rescue drone may be programmed to execute a specific search pattern, which may include flying to a designated altitude and following the same path, in reverse, that the boat was traveling when the man-overboard event occurred. The onboard GPS unit may either do its own tracking while the boat is underway, so that it is always tracking its own position and has that information available when deployed in an emergency, or the system may include a communications link with the GPS system on board the ship so that the search and rescue drone may query the shipboard GPS to obtain that information.

In another embodiment, the search and rescue drone may include two main parts: the flying portion and the floating portion. The flying portion preferably includes a frame, the motor and propeller, camera(s), flashing lights, a spotlight (optionally) and a transmitter receiver for sending and receiving communications. The floating portion is used as a life preserver, and preferably includes an EPIRB to transmit an SOS message, along with GPS coordinates. In this embodiment, the drone may land on the water as a single unit, and then separate so that the flying portion can hover overhead while displaying the flashing lights, spotlight (if necessary), and acting as a communications booster by relaying and broadcasting the EPIRB signal to potential rescuers.

Alternatively, after locating the swimmer in distress, the drone may separate in the air by disconnecting itself from the floating portion, so that the floating portion drops to the water near the swimmer. It is preferred that the EPIRB remain with the floating portion (and the swimmer) rather than the flying portion, because if the flying portion then crashes, runs out of fuel or electricity, or other rise becomes separated from the swimmer, the EPIRB continues to broadcast the SOS signal from the swimmer's location.

Other embodiments include simpler versions, There the rescue drone is simply a flying life preserver, wherein the main body member is buoyant, and motors and propellers are positioned within holes defined by the main body member. These types of rescue drones are typically used by beach lifeguards, and the like, and operate via remote control. If a lifeguard sees a swimmer in distress, then he or she can simply launch the flying life preserver and land it adjacent the swimmer in distress for flotation until help arrives.

BRIEF DESCRIPTION OF THE DRAWINGS

These and other features, aspects, and advantages of the present invention will become better understood with regard to the following description, appended claims, and accompanying drawings where:

FIG. 1 is a perspective v of one embodiment of a lifesaving unmanned aerial vehicle, having a generally rectangular body member that is buoyant, a series of handle members disposed about the body member for grasping and carrying, and a plurality of motors and propellers disposed within holes defined by the body member;

FIG. 2A is a side view of another embodiment of a lifesaving unmanned aerial vehicle, including a floating portion, a frame, a series of motors and propellers, an EPIRB, a camera, downwardly pointing flood lights and a pair of strobe lights, and further including a docking station that also serves to recharge the on-board batteries;

FIG. 2B is a side view of the embodiment of a lifesaving unmanned aerial vehicle as shown in FIG. 2A, wherein the vehicle is shown in a docked position with the docking station for storage, transport, and recharging;

FIG. 3 is a perspective view of another embodiment of a lifesaving unmanned aerial vehicle, wherein the body member is formed into the shape of a ring, and the motors and propellers are disposed within holes defined by the body member;

FIG. 4 is a perspective view of another embodiment of a lifesaving unmanned aerial vehicle, wherein the vehicle includes a winch attached on an underside thereof, with a cable extending downwardly to a harness that is attached to a basket for transporting; a person from the water to safety;

FIG. 5 is a side view of an alternate embodiment of a lifesaving unmanned aerial vehicle, showing a removable remote control carried by the main body member, and further illustrating the buoyant main body member separated from the frame of the drone, so that a swimmer in distress may use the main body member for flotation while flying the rescue drone via the remote control;

FIG. 6 is a side view of an alternate embodiment of a lifesaving un aimed aerial vehicle having a net disposed within the buoyant main body member for carrying a person, and showing a wearable device that is in communication with the rescue drone for purposes of locating a swimmer in distress;

FIG. 7 is a perspective view of another alternate embodiment of a lifesaving unmanned aerial vehicle showing an inflatable boat having a frame attached to an upper portion thereof, and further including four propellers that rotate between a horizontal plane and a vertical plane;

FIG. 8 is a side view of the alternate embodiment of the lifesaving unmanned aerial vehicle shown in FIG. 7, and further illustrating the propellers rotating in a generally horizontal plane; and FIG. 9 is a side view of the alternate embodiment of the lifesaving unmanned aerial vehicle shown in FIG. 7, and further illustrating the propellers rotating in a generally vertical plane.

DETAILED DESCRIPTION OF THE INVENTION

Flying Life Ring

The present invention, in a first embodiment, includes a new lifesaving unmanned aerial vehicle 10 (also referred to herein as a 'rescue drone' or 'search and rescue drone') comprising a main body member 12 that is buoyant, and defines a series of vertically oriented holes 14 therein, as shown in FIGS. 1 and 3 (a 'flying life ring' embodiment). Motors 16 and propellers 18 are disposed within the holes 14 of the main body member 12, which allows the main body member 12 to fly. These embodiments may simply be flown to the location of a swimmer in distress (SID), and may land on the water to serve as a life preserver until the SID can be rescued by a boat, helicopter, or by other means of rescue. Handles 20 may be disposed about the rescue drone 10, as shown in FIG. 1, for purposes of holding onto the drone 10 in the water, and for carrying the drone 10 by hand.

A solar powered recharging station may be employed for charging the drone batteries. In a preferred embodiment, the recharging station includes solar panels and/or solar energy collecting devices for capturing solar energy, and further includes a battery. The solar panels are used to keep the battery charged, and the battery charges the drone. Other types of solar chargers are known in the art, and any suitable one may be used.

Laser Coordinate Identification Control System

In another embodiment, the flying life ring rescue drone 10 (and other embodiments discussed herein may also include a laser sensor that can detect the distal end of a laser beam from a laser pointer. In other words, if a lifeguard points a laser pointer at a spot where he wishes the flying life ring to land, the laser sensor detects the end of the laser beam reflecting from the target object or spot, and the flying life ring can simply navigate itself to land on that spot. It essentially follows the laser beam, when that mode is activated.

In another embodiment, a GPS enabled laser-based range finder 100 (similar to those currently available for golfers, marksmen, and the like) may be used to 'paint the target' and determine the exact coordinates at the end of the laser beam.

This system allows any personnel with virtually no training to control, launch and deliver the rescue drone to a distressed party in any body of water. The simple to use guidance and control system creates the opportunity for those without pilot experience to launch and direct the rescue drone to the party in need.

Using components similar to those found in high end GPS based laser range finders primarily used in golf and marksman applications such as the Bushnell Hybrid Laser Rangefinder+ GPS, the responding personnel employ a handheld optical unit. This unit, appearing similar to a Monoscope, or singular telescope, may be used to select the spot where the rescue drone assistance is required. Once the target location is identified, the user pushes an initiation sequence on a button on the optical unit. This initiates a wireless communication between the handheld optical unit and the rescue drone control station, or directly to the rescue drone, itself. In one embodiment, the station incorporates a processing device (small form factor computer such as an IBM NUC) to control the rescue drone and transceiver radio for communications, monitoring and redirection of the rescue drone. The station receives the communication from the handheld optical devices, including specific coordinate information of the target site. The control station automatically creates a mission and uploads the flight information to the rescue drone. Takeoff is initiated and the rescue drone flies to the target site as a predetermined altitude. The rescue drone then descends at a predetermined rate and lands at the target for floatation and continued identification of position. Any time the operator pushed the button again the new coordinate information is uploaded to the rescue drone.

The GPS feature allows the laser range finder 100 to know its own location, and the laser range finder may also detect the precise direction in which the laser beam is pointed. Combining that information along with the range or distance to the target location, the system calculates the coordinates of the target location and transmits that information (either directly, or through a separate rescue drone station) to the rescue drone for execution.

Such a laser range finder 100 may include a transmitter to communicate with an onboard computer or programmable logic device carried by the rescue drone 10. Essentially, a lifeguard points the laser of the range finder to the target landing spot in close proximity to a swimmer in distress, and the range finder calculates the GPS coordinates of the target point and transmits that information to the rescue drone, which may autonomously fly to the target spot for landing. This system may refresh itself over very short time intervals, so that the calculations are happening repeatedly, and obviously change as the laser beam moves in real time, so that the rescue drone 10 is constantly being updated with current coordinates for a target spot. Thereby, the rescue drone 10 simply chases the laser dot and lands on the target spot, even if the target spot moves somewhat while the rescue drone 10 is en route to the target spot. One example of a GPS enabled, laser-based range finder is the Hybrid Rangefinder+ GPS, manufactured and sold by Bushnell.

It should be understood that the rescue drone 10 may be programmed to perform in different ways. For instance, the rescue drone 10 can be programmed to simply fly to the target spot and land, or the rescue drone 10 may be programmed to stop and hover over the spot at a predetermined altitude for a brief time period, or until it receives a 'land' command from the user or operator. Other target landing flight and navigation protocols may be developed and programmed, as desired.

In use, if a lifeguard sees a swimmer in distress, then he or she may launch the drone, and point the laser pointer at a spot on the water in close proximity to the swimmer in distress. The flying life ring (or any of the other versions of the rescue drone 10 discussed herein simply follows the laser beam to the spot where the laser beam is pointed, preferably in an autonomous manner. This arrangement allows a floatation device to be delivered very quickly to a swimmer in distress, at precise locations, with an easy-to-use interface—a laser pointer or GPS enabled laser-based range finder. Additionally, such a technique requires very little training for a lifeguard to operate.

Alternatively, and particularly on the larger, more sophisticated versions of the search and rescue drone discussed herein, a laser pointer or laser-based range-finder may be mounted on the rescue drone 10 itself, and operated by an operator viewing real-time camera footage from the drone 10. This feature allows a remote user to simply point the laser where he or she wishes the rescue drone 10 to land, and the drone 10 may navigate itself in the most efficient manner to that spot.

Search and Rescue

Another embodiment of the present invention is a rescue drone 10 that preferably includes a floating portion 12 (or "main body member"), a frame 42 connected to the floating portion 12, wherein the frame 42 includes outwardly extending arms, each carrying a motor 16 and propeller 18, and further including a camera 22, a transmitter receiver for receiving flight instructions and transmitting information back to an operator, lights 24 for assistance with rescue operations, and an EPIRB radio beacon 26 for transmitting an SOS call for help along with location coordinates, as shown in FIGS. 2A, 2B, 5 and 6. Additionally, the rescue drone 10 may further include an onboard computing device for controlling the above-referenced components, either via remote control 60 or autonomously based on installed programming. In this embodiment, the floating portion 12 is preferably positioned on a bottom portion of the drone 10, and may serve as a flotation device for a swimmer in distress (SID). The lights 24 may include flashing strobe lights of different colors, for attracting the attention of rescuers who are searching for the SID and the drone itself. Additionally, the drone may be equipped w with spotlights 24 used during search and rescue operations to illuminate the area that is being searched, or which may be used to illuminate the SID for various purposes.

In use, the rescue drone 10 is launched when it has been determined that there is a SID in the area, and the drone 10 may be operated manually by an operator using a remote control device 60 to fly and navigate, or the rescue drone 10 may be used in autonomous mode, so that it is capable of flying itself in a specific search pattern. For manual flight, the rescue drone 10 operates like currently available drones, which may be flown by simple visual operation (watching the drone itself directly), or by viewing the feed from the camera 22 positioned on the drone (as the drone operator were in a virtual 'cockpit' of an aircraft). In the latter case, the operator may use a video screen, goggles, or any other suitable video screen type of component.

For autonomous flight, the rescue drone 10 may be programmed to fly and navigate in many different ways. First, the drone 10 may simply be programmed to execute a standard search pattern. Alternatively, if used on a boat or ship, the rescue drone may follow the GPS "breadcrumb trail," which is essentially the path that the boat or ship has taken up to that point in time, but in the reverse direction, which is particularly useful in man-overboard situations. In this way, the drone itself may be programmed to track the movement of the ship in order to establish the breadcrumb trail, or that information may be transmitted from another GPS device onboard the boat or otherwise. Another option, if multiple drones 10 are used, is to program them to work in concert with one another, so that each drone is programmed to cover a particular area or direction, and so that the drones 10 are not searching the same area as another drone 10, in order to optimize the amount of area covered as quickly as possible during a search and rescue operation.

It is also contemplated that the rescue drone 10 may include infra-red or thermal sensors (which may be part of the camera 22, or may be separate from the camera 22), in order to identify people in the water through their heat signatures. Obviously, a live person in the water will have a higher temperature than the surrounding water, so infra-red or thermal sensors or cameras may be used to help identify SIDs. Another option is to provide the rescue drone 10 with software that recognizes patterns, and also recognizes disruptions in patterns, such the patterns of waves in the water, which are disrupted by a SID. Any of these methods may be used to autonomously identify a SID, which may generate an alert to a human operator, who may then either confirm that the rescue drone 10 has found the SID, or may confirm that the object identified is not a SID, or may take over control of the drone 10 in order to investigate further. Alternatively, the drone 10 may simply be programmed to land near the SID without human intervention, if necessary.

Wearable Devices

It is also contemplated that the rescue drone 10 may receive a signal, including location information, from a device worn or carried by a person. Such a device could take many forms, including a cell phone, a smart watch (Apple Watch, for instance), a bracelet or necklace, or any other device that includes either an RFID chip or necessary electronics and transmitter for sending a signal to the rescue drone 10. For these purposes, the transmitter device will be referred to as a transmitter bracelet 50, as shown in FIG. 6, and it should be understood that a transmitter bracelet, for these purposes, encompasses any wearable device that transmits a signal or communicates in any way with the rescue drone to provide a rescue location or coordinates. The transmitter bracelet 50 may be worn by dockhands on a fishing boat crew and/or passengers on a cruise ship, or others onboard a boat, and may be activated either automatically in a man-overboard situation, or may be activated manually. Activation of the transmitter bracelet 50 preferably alerts the boat captain and crew of the man-overboard situation, and causes the rescue drone 10 to automatically deploy and follow the transmitter bracelet 50 signal to the location of the SID. Alternatively, the rescue drone 10 may be launched manually in such a situation.

In one embodiment, the rescue drone 10 mates with a docking base charging station 28 when not in use, or when in 'standby mode,' as shown in FIGS. 2A and 2B. The charging station 28 is preferably connected to a power source, and serves as a charger for the rescue drone 10, so that the rescue drone 10 stays charged and ready to be deployed at all times. In one embodiment, the charging station 28 may be in the shape of a cone (as shown), so that the rescue drone 10 may automatically fly back and land on the charging station 28 without human intervention, although other shapes may be used. The cone shape allows the rescue drone 10 to descend down on top of the charging station 28 so that the round floating portion 12 may be guided by the shape of the cone until the charging surfaces 30 are connected between the drone 10 and the charging station 28. This arrangement also allows the drone 10 to be deployed directly from the charging station 28 in an emergency, so that the drone 10 simply launches upwardly until it clears the top of the charging station 28 and then begins its search or navigation mission.

In use, the rescue drone 10 either searches for a SID, or flies directly to the location of the transmitter bracelet 50. Upon arrival at the location of the SID, the rescue drone 10 may land close to the SID, so that the SID may use the rescue drone 10 as a flotation device. Additionally, the rescue drone 10 may activate its lights 24 in order to assist rescuers in finding the SD, and may further activate the EPIRB 26, which sends a distress signal out on an emergency frequency, along with location information. These actions may be automated, or may be taken manually by a human operator.

Rescue Drones for Carrying Passengers

In another embodiment, the rescue drone 10 includes a basket 32, harness, or other means for actually recovering a swimmer in distress, and flying that person back to a ship or to shore, as shown in FIG. 4. In this embodiment, the drone 10 may either land in the water so that a swimmer in distress may climb aboard, or the drone 10 may lower a basket 32 or harness down to the swimmer while the drone 10 hovers overhead. In either embodiment, the drone 10 may be equipped with a button 36 or other means for indicating that the swimmer is safely aboard the basket 32 or is engaged within the harness, which then triggers the drone 10 to fly the swimmer back to safety. Alternatively, this operation may be carried out manually by a human operator using a remote control device 60, which may be a dedicated device, a smart phone, a computer, a tablet, or any other suitable remote control device 60. In this embodiment, the basket 32 or harness may be attached to a cable 38 and winch 40 system, similarly to those deployed on rescue helicopters used by the Coast Guard and the military.

For autonomous operation of any embodiment disclosed herein, the rescue drone 10 may include an on-board computing device to execute programmed operations, including navigation and flight, identification of objects in the water, sending and receiving information, landing, activating lights 24 and the EPIRB 26, and returning to the boat, charging station 28, or other place of origin. The rescue drone 10 may also record camera footage and/or sensor readings from a full mission, and may transmit that data in real time, or may simply record it for access and download later. In one embodiment, the rescue drone 10 may also carry a remote control (tablet style computing; device), or an array including a microphone, speaker, and/or video screen for audio and/or video communications between a human operator (rescuer) and the SID. For instance, the rescue drone 10 may employ a small screen, similar to the screen of a smart phone, allowing a SID to communicate with the drone operator or rescuer (similarly to Apple's popular FaceTime application), which is useful for allo ring the rescuer to ascertain the medical condition of the SID. This arrangement allows the rescuer to be prepared with appropriate medical supplies to deal with the specific issues and ailments that the SID is suffering from. Additionally, in the case of a boat accident or other incident where there may be wreckage, fire, oil floating in the water, or other dangers, the SID can communicate that information through the audio/video transmission components on the rescue drone.

Additionally, it is contemplated that the onboard computing device 70, which may be roughly the size and shape of a smart phone or tablet, may serve as a remote control and be detachable from the drone, so that a SID may use the onboard computing device 70 to operate the rescue drone in the case of a prolonged rescue situation, as shown in FIG. 5. For example, if the SID is out of communication range with rescuers for any reason, he or she may detach the onboard computer 70 to launch the drone 10 from the water. The rescue drone 10 may possibly increase its transmission range by ascending to a higher altitude. Additionally, the SID may also be able to view the camera feed from the drone 10 via the onboard computing device j remote control, and if he sees a watercraft in the distance, may send the drone 10 in that direction to establish communication and request assistance, Or, if the SID is in the water at night, he may wish to simply launch the rescue drone 10 and activate the lights 24 while maintaining physical contact with the floating portion 12, allowing the drone 10 to hover overhead, in order to direct the rescuers to his position in darkness, similarly to launching a flare. In a preferred embodiment, the onboard computer/remote control 70 fits into a cradle that is positioned on the rescue drone, and the cradle is operationally connected to an onboard battery. In this way, the onboard computer 70 may recharge itself when it is positioned within the cradle.

The rescue drone 10 may also include solar panels positioned on an upper side thereof, which may be used to charge or recharge the rescue drone battery or batteries. It should be understood that, although different embodiments have been described herein, any of the components and features described in a particular embodiment may be used on or in connection with any other embodiment described herein.

In yet another embodiment of the rescue drone 10, the floating portion 12 (which is used as a flotation device for a SID) may be detachable (either remotely, or manually) from the frame 42 of the rescue drone 10, so that the rescue drone 10 may either land on water and subsequently separate, if necessary, or so that the floating portion 12 may be detached during flight and dropped to a SID. In this embodiment, as shown in FIG. 5, it is contemplated that the EPIRB 26 is attached to the floating portion 12, in order to direct rescuers to the SID in a scenario where the rescue drone 10 becomes separated from the floating portion 12 and the SID. Further, in this embodiment, the onboard computer/remote control 70 may also be attached to the floating portion 12, so that the SID is able to operate the rescue drone 10 from the water, if necessary. One advantage to this arrangement is that the SID has a flotation device while the drone 10 is at a higher altitude and serving as a communications relay between rescuers and the SID. In some situations, the SID may be in the water with the floating portion 12, and the drone 10 may be hovering overhead with lights 24 flashing, transmitting an emergency distress signal, and shining a spotlight 24 down on the SID.

Yet another embodiment of the present invention is shown in FIG. 6, wherein the floating portion 12 includes a net 80 or other support surface for supporting and carrying a rescued swimmer in distress. In this embodiment, the swimmer in distress simply climbs aboard the rescue drone and sits on the net 80, and the rescue drone may fly the rescued swimmer to the boat to shore, or to some other designated safety area.

Rescue Drone/Fanboat

FIGS. 7-9 show another alternate embodiment of a lifesaving unmanned aerial vehicle, a rescue drone/fanboat. In this embodiment, the main body member 12 is preferably in the form of an inflatable watercraft having a floor and a transom, although any suitable boat or buoyant structure may be used. A frame member is attached to the inflatable watercraft, and other electronic components may be attached to the frame, including strobe lights and general purpose lights, a GPS, a transmitter/receiver, and the like. The watercraft may also include a compartment or dry-box for mounting other types of electronics, and/or for storage of survival gear, water, flares, a remote control, or any other types of cargo. Handles or a safety line may be attached at any desirable place on the watercraft or the frame. In a preferred embodiment, a safety line is attached along the sides of the watercraft, as shown in FIGS. 7-9.

The frame also carries pivoting mounts 104 for four propellers 18, wherein the pivoting mounts 104 are preferably powered for automated rotation. The pivoting mounts 104 may pivot in the range from 90 degrees to 360 degrees, as desired. The pivoting mounts 104 allow the propellers 18 to rotate from a horizontal plane to a vertical plane. This embodiment is designed to take off and land vertically, while the propellers 18 rotate in a generally horizontal plane. The propellers 18 are preferably disposed within a cage 106 or other similar type of device, in order to allow air to pass through efficiently, and also reduce the likelihood of accidents where the propeller 18 might come into violent contact with wreckage, debris, a human extremity, or the like.

In use, the search and rescue drone 10 of FIGS. 7-9 launches vertically, flies to a SID, and lands on the water nearby in a vertical manner. After the SID has boarded, and is safely within the watercraft the propellers 18 rotate by roughly 90 degrees, so that they are pushing air toward the rear of the watercraft or main body member 12. At this point, the watercraft essentially becomes a fan boat, because the propellers 18 are propelling the watercraft carrying the SID forward by blowing air in a backward direction. This arrangement also allows the search and rescue drone 10 to carry smaller motors for rotating the propellers 18, when compared to other versions that lift SIDs out of the water and fly them to safety, because the motors are not required to lift the extra weight of a person or people out of the water.

It is contemplated that the search and rescue drone/fanboat 10 may be designed to carry a single passenger or multiple passengers, and this version of the invention may carry or be equipped with any of the other features or components that are discussed elsewhere herein.

Any of the above-referenced embodiments may include other features, as well, including a waterproof or water-resistant hatch 44 on the floating portion that opens to reveal a storage compartment 46 that may be used to store rescue supplies, such as water, food, reflective gear, flashlights, an inflatable raft, a survival suit, or any other supplies that may be helpful to a swimmer in distress. Additionally, it should be understood that the motors described herein may be powered by electricity, gasoline, diesel, hydrogen, natural gas, propane, or any other suitable method.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A lifesaving unmanned aerial vehicle system comprising:
   a main body member that is buoyant, said main body member including a support surface, so that a swimmer in distress may climb aboard said main body member, and wherein said swimmer is supported by said support surface;
   a frame member extending upwardly from said main body member, said frame member farther including a series of arms extending outwardly so that a motor and propeller are disposed at a distal end of each arm;
   a pivoting mount attached to said arms, said each said pivoting mount carrying a motor and a propeller, wherein said pivoting mount pivots in at least a 90 degree range and allowing said propellers to rotate in a range of motion from generally horizontal plane or a generally vertical plane;
   said frame member carrying a transmitter and receiver, a battery, and an onboard computing device; and
   a remote control device that wirelessly communicates with said transmitter and receiver for flying said unmanned aerial vehicle system, and further, for controlling said lights, said camera, and for receiving video images from said camera.

2. The lifesaving unmanned aerial vehicle system set forth in claim 1, further including an EPIRB radio beacon attached to said unmanned aerial vehicle for transmitting a distress signal along with location coordinates of said unmanned aerial vehicle.

3. The lifesaving unmanned aerial vehicle system set forth in claim 1, further including a storage compartment disposed within said main body member for transporting survival supplies to a swimmer in distress.

4. The lifesaving unmanned aerial vehicle system set forth in claim 1, further including a wearable transmitter bracelet, wherein said transmitter bracelet communicates wirelessly with said onboard computing device, and Therein said onboard computer is programmed to fly said lifesaving unmanned aerial vehicle to the location of said transmitter bracelet and land on water in that location.

5. The lifesaving unmanned aerial vehicle system set forth in claim 1, further including a camera attached to said frame member.

6. The lifesaving unmanned aerial vehicle system set forth in claim 1, further including a laser range-finder having a transmitter in communication with said receiver, wherein said laser range finder emits a laser beam toward an object, determines the location of said object, and transmits coordinates of said object location to said receiver, and wherein said on board computer executes navigational and operational commands based on said coordinates, so that said lifesaving unmanned aerial vehicle flies to and lands at said coordinates.

* * * * *